(12) United States Patent
Oh

(10) Patent No.: US 6,471,386 B2
(45) Date of Patent: Oct. 29, 2002

(54) MOUNTING STRUCTURE OF AUTOMOBILE HEADLAMP

(75) Inventor: Se Wook Oh, Kyoungki-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/751,186

(22) Filed: Dec. 29, 2000

(65) Prior Publication Data
US 2002/0051366 A1 May 2, 2002

(30) Foreign Application Priority Data
Nov. 2, 2000 (KR) .......................... 2000-65025

(51) Int. Cl.$^7$ ................................................ F21V 7/04
(52) U.S. Cl. .................. 362/549; 362/369; 362/507; 362/546
(58) Field of Search ................................ 362/459, 505, 362/506, 507, 523, 546, 549, 369

(56) References Cited

U.S. PATENT DOCUMENTS

| 4,475,148 A | * | 10/1984 | Tomforde ................ 362/549 |
| 4,658,335 A | * | 4/1987 | Culler ..................... 362/549 |
| 6,135,619 A | * | 10/2000 | Donaire Camacho et al. ........ 362/549 |
| 6,190,030 B1 | * | 2/2001 | Chase ..................... 362/369 |

* cited by examiner

Primary Examiner—Stephen Husar
(74) Attorney, Agent, or Firm—Christie, Parker & Hale, LLP

(57) ABSTRACT

This invention relates to a mounting structure of automobile headlamp which can cope with the current Safety Rule for Pedestrians in Europe by properly absorbing the impact during automobile accident with inserting and mounting a bellow spring to conventional mounting boss divided by two and a bellows spring bracket to conventional bolt and snap fitting pin.

9 Claims, 4 Drawing Sheets

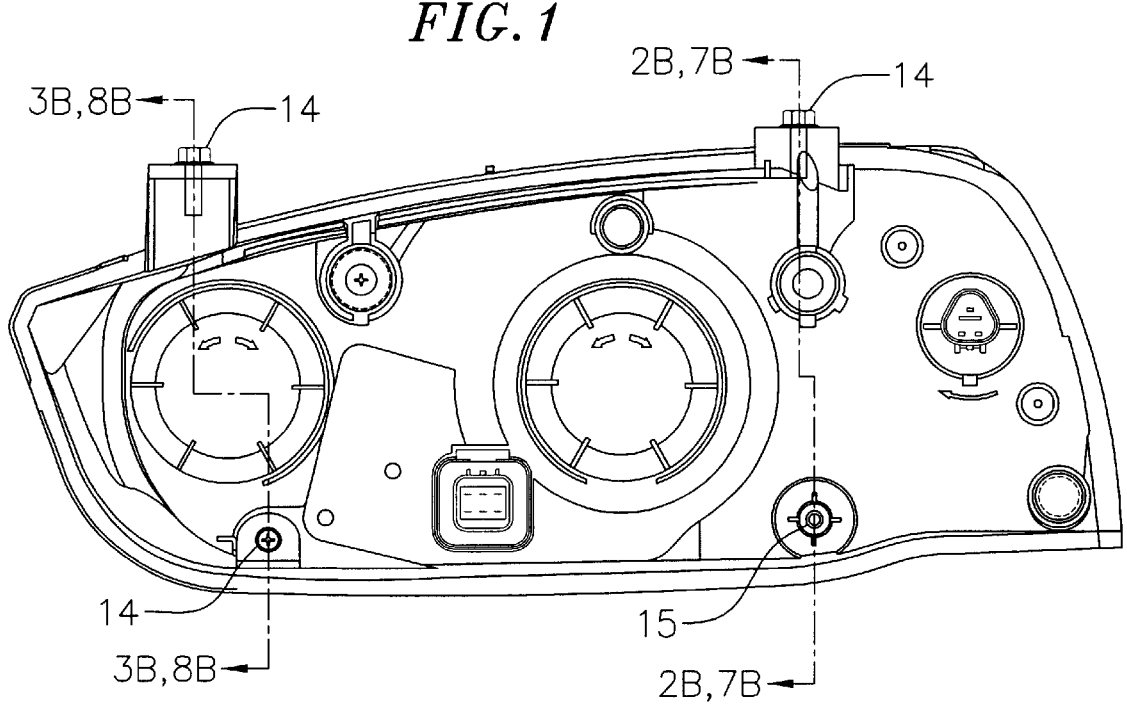
FIG. 1
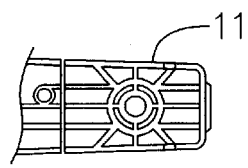
FIG. 2A
FIG. 2B
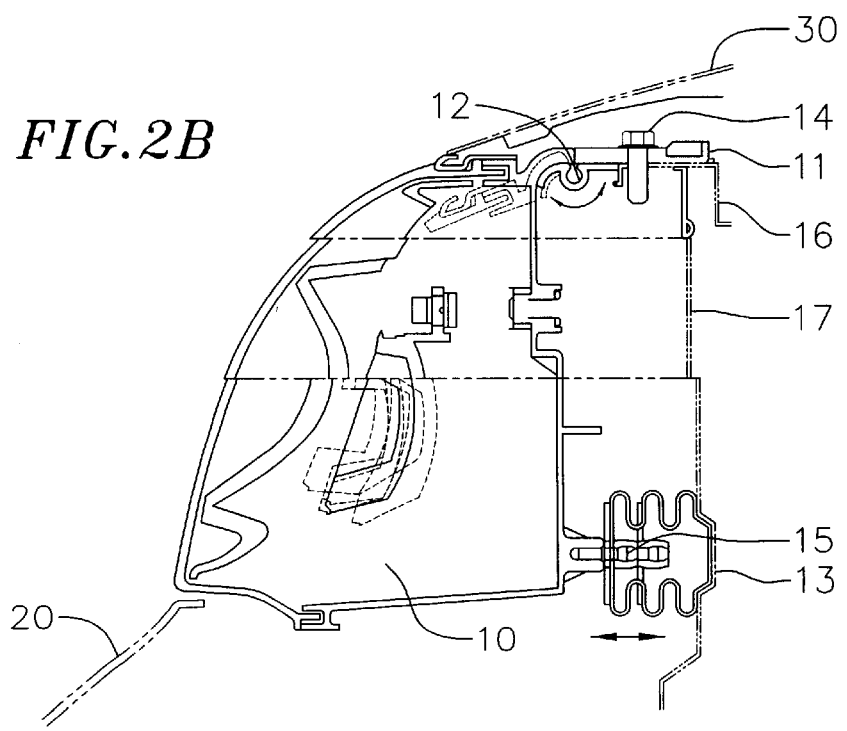

MOUNTING STRUCTURE OF AUTOMOBILE HEADLAMP

CROSS-REFERENCE TO RELATED APPLICATION

This application claims priority of Korea patent Application No. 2000-65025, filed on Nov. 2, 2000.

BACKGROUND OF THE INVENTION

1. Field of the Invention

This invention relates to a mounting structure of automobile headlamp which can cope with the current Safety Rule for Pedestrians in Europe by properly absorbing the impact during automobile accident with inserting and mounting a bellow spring to conventional mounting boss divided by two and a bellows spring bracket to conventional bolt and snap fitting pin.

2. Brief Description of Prior Art

Generally, since a mounting structure of automobile headlamp is firmly mounted to an automobile body, there is no available structure to absorb the impact force except for a front bumper during the automobile accident with a pedestrian.

As shown in FIGS. 7 and 8, the conventional mounting structure of automobile headlamp is fabricated in a manner such that a monoblock mounting boss 11 is mounted to an upper member panel 16 of a headlamp housing with a bolt 14, while the lower end of the headlamp housing 10 is mounted to a supporting panel 17 with a snapping fitting pin 15 or bolt 14.

However, the conventional mounting structure of automobile headlamp cannot meet the current Safety Rule for Pedestrians in Europe, since its firmly mounted parts to the automobile body is vulnerable to cracking owing to the impact force generated during an automobile accident.

For reference the current Safety Rule for Pedestrians in Europe prescribes that an automobile manufacturer, who intends to export his/her automobiles to Europe, should obtain a certificate warranting the impact-absorbing structure of automobile parts in order to further protect the pedestrian when the front part of an automobile collides with a pedestrian Further, the testing procedures of the safe rule requires that when any impact force is provided to the upper part of headlamp at the angle of 45~50° upward from the headlamp, the headlamp should be designed to have an impact force of less than 300 Nm moment.

SUMMARY OF THE INVENTION

To cope with the current Safety Rule for Pedestrians in Europe, therefore, an object of this invention is to provide a mounting structure of automobile headlamp that is elastically moved backward and downward so that its parts can absorb the impact power from the automobile accident by mounting a bellows spring and bellows spring bracket.

BRIEF DESCRIPTION OF THE DRAWINGS

FIG. 1 is a rear side view showing a mounting structure of automobile headlamp;

FIG. 2, consists of FIGS. 2A and 2B, FIG. 2B being a cross-section view along lines 2B–2B of FIG. 1 showing the mounting structure of automobile headlamp according to this invention and FIG. 2A being an enlarged top view of mounting boss 11;

DETAILED DESCRIPTION OF THE INVENTION

Figure 3A:
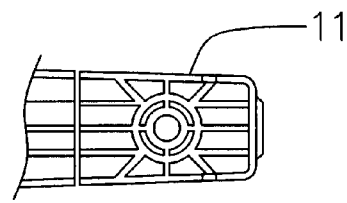
FIG. 3, consists of FIGS. 3A and 3B, FIG. 3B being a cross-section view along lines 3B–3B of FIG. 1 showing the mounting structure of automobile headlamp according to this invention and FIG. 3A being an enlarged top view of mounting boss 11.

This invention is characterized by the following structure:

This invention is characterized by a mounting structure of automobile headlamp, wherein a buffer member is mounted to both sides from the lower end of a support panel 17 supporting a headlamp housing 10, and a joint member for impact absorption is also mounted to the two-divided part of mounting boss 11 formed in both sides from the upper end of an upper member panel 16.

In particular, this invention is characterized by a mounting structure of automobile headlamp, wherein the buffer member mounted to the support panel 17 is a bellows spring bracket 13.

Further, this invention is characterized by a mounting structure of automobile headlamp, wherein said bellows spring bracket 13 is a plate-type bellows where a wave-shape bend is formed upward and downward so as to easily accommodate an elasticity.

In addition, this invention is characterized by a mounting structure of automobile headlamp, wherein said spring bracket 13 is a cylindrical-type elastic bellows whose radial side has a wave-shape upward and downward.

Further, this invention is characterized by a mounting structure of automobile headlamp, wherein the joint member located at the two-divided part of mounting boss 11 is a bellows spring 12.

Also, this invention is characterized by a mounting structure of automobile headlamp, wherein the bellows spring 12 is a plate-type member whose center part is bent in a circular form so as to easily accommodate an elasticity.

Hence, unexplained code 20 is a front bumper which serves to absorb the impact force during the automobile accident, and unexplained code 30 is a hood.

This invention is explained in more detail by the accompanying drawings as set forth hereunder.

Figure 3B:
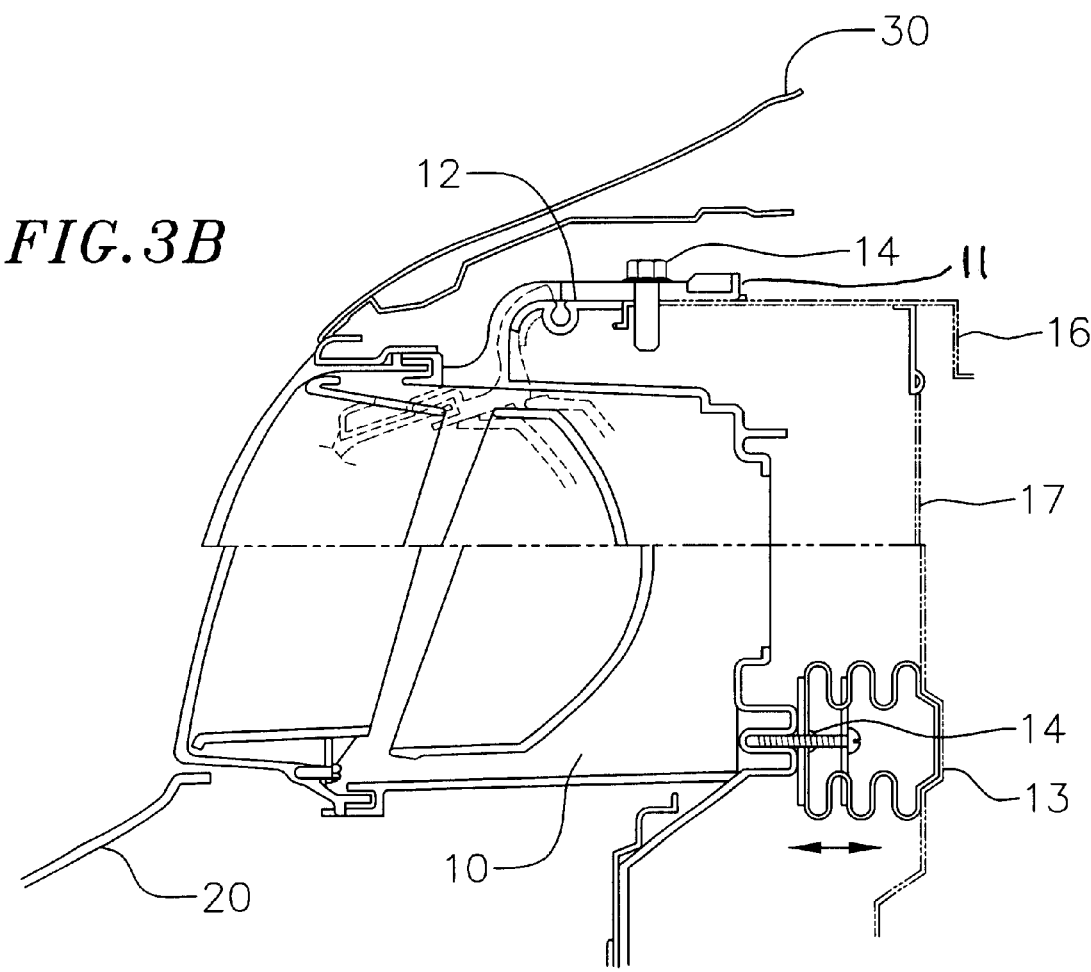
Figure 4:
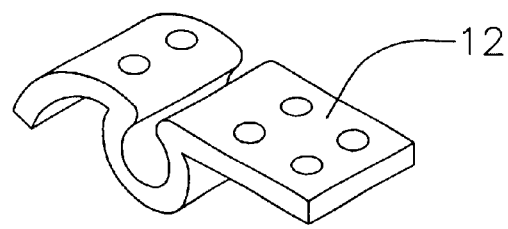
FIG. 4 is a perspective view of a bellows spring according to this invention.
Figure 5:
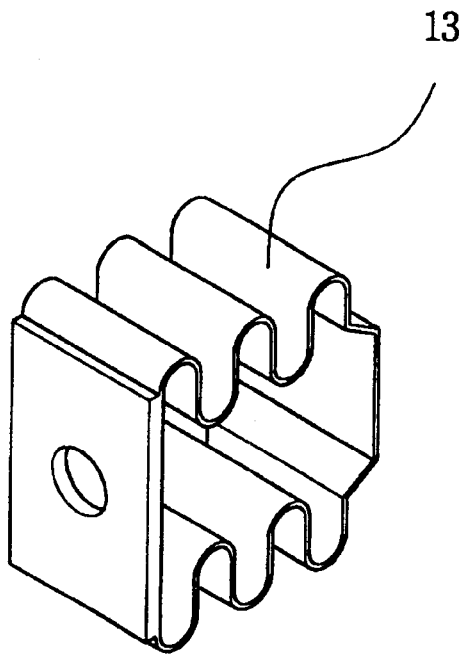
FIG. 5 is an embodiment of a bellows spring bracket according to this invention.

FIG. 1 is a rear side view showing a mounting structure of automobile headlamp; FIG. 2 is a 'A—A' line cross-section view of FIG. 1 showing the mounting structure of automobile headlamp according to this invention; and, FIG. 3 is a 'B—B' line cross-section view of FIG. 1 showing the mounting structure of automobile headlamp according to this invention.

Hence, Code No. 10 is a headlamp housing.

The headlamp housing is supported by the support panel 17 and upper member panel 16 mounted to the upper end of the support panel 17.

The headlamp housing is also supported by the support panel 17 vertically and upper member panel 16 horizontally.

The headlamp housing 10 is mounted to both sides of the lower end of the support panel 17 with the snap fitting pin 15 and bolt 14 and at the same time, a bellows spring bracket 13, which is welded to the support panel 17, is a plate-type bellows where a wave-shape bend is formed upward and downward so as to easily accommodate an elasticity.

Two mounting bosses 11 are mounted to both sides of the upper end of the upper member panel 16 with the bolt 14. The two mounting bosses are divided by two, when impacted.

A bellows spring 12, which is mounted to the two-divided part of mounting boss 11, a plate-type member whose center part is bent in a circular form so as to easily accommodate an elasticity.

Figure 6:
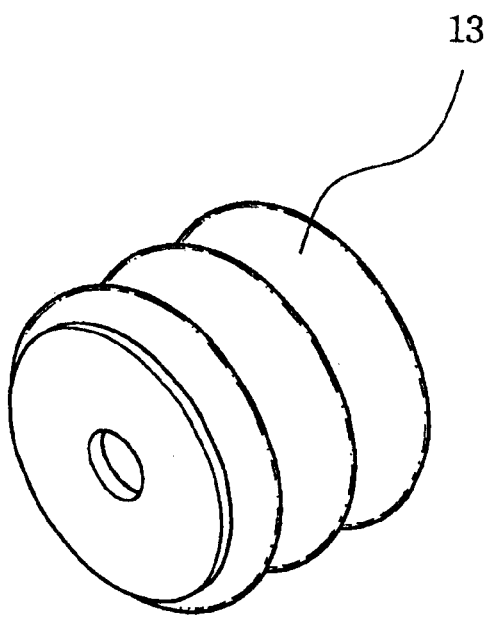
FIG. 6 is another embodiment of a bellows spring bracket according to this invention.
Figure 7A:
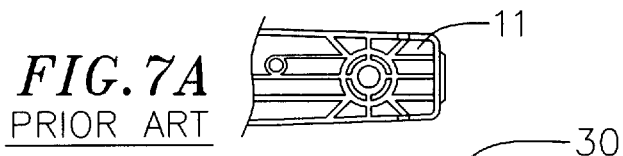
FIG. 7, consists of FIGS. 7A and 7B, FIG. 7B being a cross-section view along lines 7B–7B of FIG. 1 showing the conventional mounting structure of automobile headlamp and FIG. 7A being an enlarged top view of mounting boss 11; and, FIG. 8, consists of FIGS. 8A and 8B, is a cross-section view along lines 8B–8B of FIG. 1 showing the conventional mounting structure of automobile headlamp and FIG. 8A being an enlarged top view of mounting boss 11.
Figure 7B:
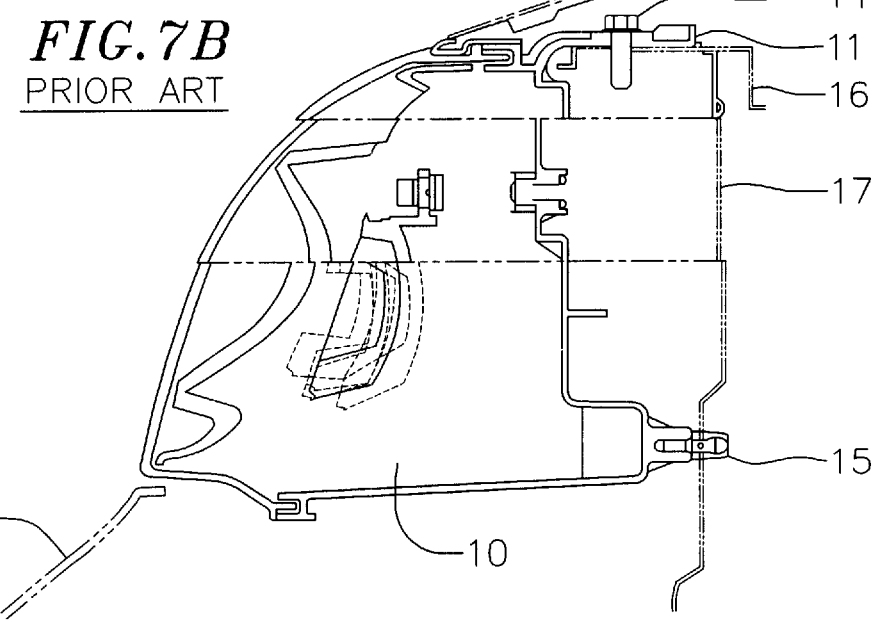
Figure 8A:
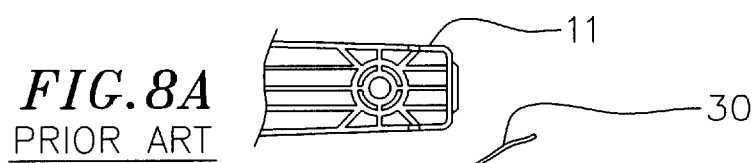
Figure 8B:
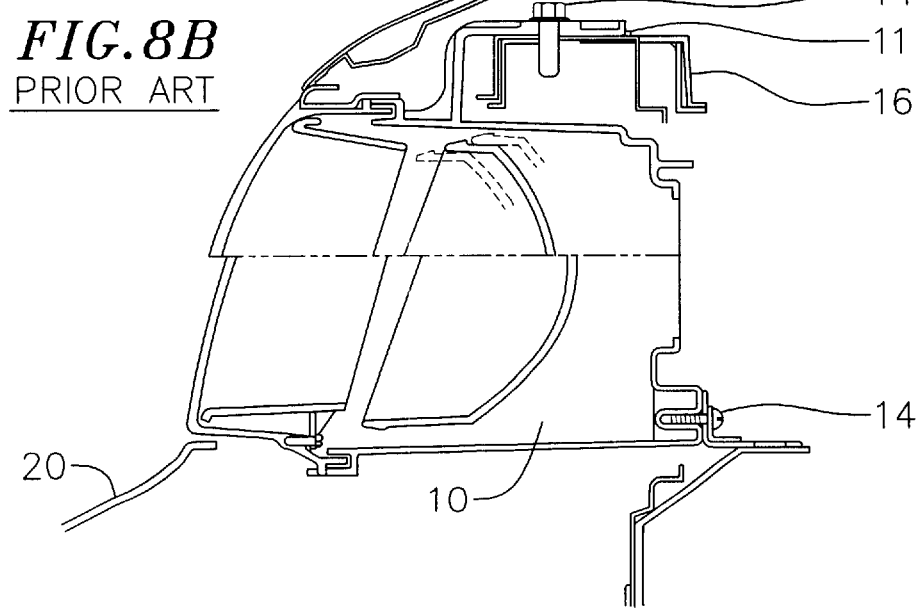

Meantime, FIG. 6 is another embodiment of a bellows spring bracket according to this invention. The spring bracket 13 is a cylindrical-type elastic bellows whose radial side has a wave-shape upward and downward.

Further, this invention is explained based on the operation of the mounting structure of automobile headlamp.

As shown in FIGS. 2 and 3, when the impact force is provided to the upper end of automobile headlamp, the mounting means for the mounting boss 11 of automobile headlamp and headlamp will have moment.

Hence, the mounting boss 11 is divided into two and at the same time, the bellows spring 12 is mounted to a lower end of the two-divided portion of the mounting boss 11 with bolt and rivet, thus absorbing the impact efficiently.

In the same manner, the bellows spring bracket 13, which is welded to the support panel 17 and mounted with the snap fitting pin 15 and bolt 14, can absorb the impact force (moment), As described above, this invention relates to a mounting structure of automobile headlamp which can improve its impact resistance and cope with the current Safety Rule for Pedestrians in Europe by properly absorbing the impact during automobile accident, wherein it comprises: to the conventional mounting structure consisting of the mounting boss 11, bolt 14 and snap fitting pin 15, a bellows spring 12 is mounted to the mounting boss divided by two, while a bellows spring bracket 13 is mounted to the mounting boss 11, bolt 14 and snap fitting pin 15.

What is claimed is:

1. A mounting structure for an automobile headlamp comprising:

a buffer member mounted to a lower end of a support panel that supports a headlamp housing; and a joint member for impact absorption mounted to an upper end of an upper member panel that supports the headlamp housing.

2. The mounting structure of claim 1, wherein said buffer member mounted to said support panel is a bellows spring bracket.

3. The mounting structure of claim 2, wherein said bellows spring bracket is a plate-type bellows.

4. The mounting structure of claim 2, wherein said bellows spring bracket is a cylindrical-type elastic bellows whose radial side is wave shaped.

5. The mounting structure of claim 1, wherein said joint member is a bellows spring.

6. The mounting structure of claim 5, wherein the bellows spring is a plate-type member whose center part is bent in a circular form so as to easily accommodate an elasticity.

7. The mounting structure of claim 1, wherein the buffer member and the joint member are elastic, such that the headlamp housing is elastically supported.

8. The mounting structure of claim 1, wherein the joint member moves in any of a plurality of absorption paths when the automobile headlamp is impacted by an outside force dependent upon the angle of impact of the outside force on the automobile headlamp.

9. The mounting structure of claim 1, wherein the lower end of the support panel and the upper end of the upper member panel have two sides, such that the buffer member is mounted to both sides of the lower end of the support panel, and the joint member is mounted to both sides of the upper end of the upper member panel.

* * * * *